US009221200B2

(12) United States Patent
Vanswijgenhoven et al.

(10) Patent No.: US 9,221,200 B2
(45) Date of Patent: Dec. 29, 2015

(54) METHOD FOR PRODUCING A PRESSURE-RESISTANT AND/OR LEAK-TIGHT VESSEL FOR HOLDING A GAS AND/OR LIQUID

(75) Inventors: Tony Vanswijgenhoven, Hasselt (BE); Dieter Vanswijgenhoven, Kermt (BE)

(73) Assignee: COVESS N.V., Hasselt (BE)

( * ) Notice: Subject to any disclaimer, the term of this patent is extended or adjusted under 35 U.S.C. 154(b) by 126 days.

(21) Appl. No.: 14/126,255

(22) PCT Filed: Jul. 4, 2012

(86) PCT No.: PCT/BE2012/000036
§ 371 (c)(1),
(2), (4) Date: Dec. 13, 2013

(87) PCT Pub. No.: WO2013/006926
PCT Pub. Date: Jan. 17, 2013

(65) Prior Publication Data
US 2014/0117589 A1    May 1, 2014

(30) Foreign Application Priority Data
Jul. 12, 2001    (BE) .................................. 2011/0441

(51) Int. Cl.
*B29C 41/22*    (2006.01)
*F17C 1/06*    (2006.01)
(Continued)

(52) U.S. Cl.
CPC ................. *B29C 41/22* (2013.01); *B29C 41/04* (2013.01); *B29C 49/20* (2013.01); *F17C 1/06* (2013.01); *F17C 1/16* (2013.01); *B29C 53/56* (2013.01); *B29C 2035/1616* (2013.01); *B29C 2049/2017* (2013.01); *B29C 2049/2026* (2013.01); *B29C 2791/001* (2013.01); *B29L 2031/7156* (2013.01); *F17C 2201/0109* (2013.01);
(Continued)

(58) Field of Classification Search
None
See application file for complete search history.

(56) References Cited

U.S. PATENT DOCUMENTS 3,426,940 A * 2/1969 Broerman ..................... 220/644
3,479,501 A * 11/1969 Pisciotta et al. .............. 362/355
(Continued)

FOREIGN PATENT DOCUMENTS

DE    1806288 A1    5/1970
EP    1 234 654 A1    8/2002
FR    2871091 A1    12/2005

OTHER PUBLICATIONS

International Search Report of the International Searching Authority, mailed Oct. 4, 2012, from counterpart International Application No. PCT/BE2012/000036, filed Jul. 4, 2012.
(Continued)

*Primary Examiner* — Monica Huson
(74) *Attorney, Agent, or Firm* — HoustonHogle, LLP

(57) ABSTRACT

The present invention relates to a method for the manufacture of pressure-resistant gas and/or liquid tight containers made from thermoplastic materials. To this end the method comprises the following steps: providing a removable external mandrel around a neckpiece, followed by providing at the inside of such mandrel a thermoplastic material for the manufacture of a thermoplastic internal wall. Hereupon the external mandrel is removed and the thermoplastic internal wall is filled with a cooling liquid. Hereupon additional thermoplastic material is provided to the external side of the thermoplastic wall and is consolidated either during the provision hereof, or thereafter or both. Hereupon the cooling liquid is removed and the container is ready for being used.

10 Claims, 7 Drawing Sheets

(51) Int. Cl.
  *F17C 1/16* (2006.01)
  *B29C 41/04* (2006.01)
  *B29C 49/20* (2006.01)
  *B29C 35/16* (2006.01)
  *B29L 31/00* (2006.01)
  *B29C 53/56* (2006.01)

(52) U.S. Cl.
  CPC .. *F17C 2201/058* (2013.01); *F17C 2203/0604* (2013.01); *F17C 2203/066* (2013.01); *F17C 2203/067* (2013.01); *F17C 2203/0619* (2013.01); *F17C 2203/0673* (2013.01); *F17C 2203/0675* (2013.01); *F17C 2209/2127* (2013.01); *F17C 2209/2145* (2013.01); *F17C 2209/2154* (2013.01); *F17C 2209/232* (2013.01); *F17C 2250/043* (2013.01); *F17C 2250/0491* (2013.01); *F17C 2260/01* (2013.01); *F17C 2260/011* (2013.01); *F17C 2270/0754* (2013.01)

(56) References Cited

U.S. PATENT DOCUMENTS 4,705,468 A * 11/1987 LeBreton ............... 425/116
4,783,232 A * 11/1988 Carbone et al. ........ 156/172
5,288,450 A    2/1994 Koizumi et al.

OTHER PUBLICATIONS

International Preliminary Report on Patentability and the Written Opinion of the International Searching Authority issued Jan. 14, 2014, from counterpart International Application No. PCT/BE2012/000036 filed on Jul. 4, 2012.

* cited by examiner

METHOD FOR PRODUCING A PRESSURE-RESISTANT AND/OR LEAK-TIGHT VESSEL FOR HOLDING A GAS AND/OR LIQUID

RELATED APPLICATIONS

This application is a §371 National Phase Application of International Application No. PCT/BE2012/000036, filed on Jul. 4, 2012, now International Publication No. WO 2013/006926 A1, published on Jan. 17, 2013, which International Application claims priority to Belgian Application No. BE/2011/0441, filed on Jul. 12, 2011, all of which are incorporated herein by reference in their entirety.

TECHNICAL FIELD OF THE INVENTION

This invention relates to a method for producing pressure-resistant and/or leak-tight vessels for holding a gas and/or liquid. According to the method of the invention said vessels can be manufactured in a manner such that they consist entirely of consecutive layers of thermoplastic materials. Vessels produced using this method can be used in the industrial manufacture of for example fire-extinguishers or gas cylinders.

BACKGROUND ART OF THE INVENTION

Usually vessels designed for holding gases and/or liquids, especially when the gases and/or liquids are stored under high pressure, are constructed out of metal. Gas cylinders or fire-extinguishers are examples hereof. These are vessels that consist of a steel (outer) casing, usually shaped in the form of a cylinder, having a steel neckpiece or fitting at one end. In the case of the pressurized gas cylinder, the material in such cylinder is separated from the outside environment by a stopper or plug that is screwed onto the fitting.

In the case of the fire-extinguisher, the pressurized cylinder is connected to a nozzle that, in case of an emergency, using a nozzle-mounted lever, sprays the contents of the extinguisher onto the source of danger which is in most cases a fire.

A first disadvantage of such metal/steel vessels is their weight. This is especially noticeable in vessels with a higher capacity, for example a fire-extinguisher with a capacity of more than 10 kg. Their large weight makes such high capacity vessels difficult to handle and limits their usability in real world applications.

Because a large proportion of these vessels have to be used in cases of an emergency, where weight and consequently ease of use is crucial, this disadvantage becomes more pronounced. A second disadvantage of these metal/steel vessels is their price, dictated by the high manufacturing costs. A third disadvantage is rust. This occurs for example in the case of fire-extinguishers as a result of the interaction between the metal casing and the fire-extinguishing contents. The rust consequently is formed on the inside of the vessel and is thus not noticeable from the outside. Rust forming in fire-extinguishers is especially noticeable when they are filled with a particularity aggressive type of extinguishing agents such as a foam based extinguisher. When the amount of rust becomes substantive, the inside of the vessel can be corroded in such a way that, when it is used, the generated pressure can cause the vessel to explode in the operators hands.

WO 01/14212 A2 published Mar. 1, 2001, describes this problem and proposes a solution for this problem. The proposed solution consists of adding a second vessel within the metal vessel. This inner container consists of a thermoplastic synthetic material. As an example, a description is given of the procedure of adding such an inner container using blow-molding, in this case a pre-form or pre-product made of polyethylene terephthalate. This technique creates a vessel consisting of two layers with the inner layer acting as an effective protection against corrosion from a potentially aggressive fire-extinguisher material. The metal outer layer gives the vessel its actual strength. Using the blow-molding technique, the metal outer layer functions as the outer mechanical mold. In order to let the air between the synthetic pre-form and the metal outer layer escape during blow-molding, air escape holes have to be provided through the metal outer layer, connecting the inside of the vessel with the outside atmosphere.

This obviously reduces the strength of the outer layer and renders this technique for a practical application virtually unsuitable. For example, one of the principal requirements of a fire-extinguisher is to be able to contain the pressurized propellant for an extended period of time. In order to achieve this, mechanical strength is essential and by providing air escape channels this strength is greatly reduced.

Nevertheless, this technique is considered advantageous compared to other multi-layer-vessel techniques described by inventions disclosed as prior art. These techniques include adding an inner layer consisting of either a thermoplastic synthetic powder, a phenol-formaldehyde varnish or a multi-component synthetic resin.

A further disadvantage of the traditional metal fire-extinguishers is that they can be potentially lethal, in the sense of becoming a potential bomb, under certain circumstances. These conditions occur e.g. when they are left unused in or near a fire. The heat from said fire can cause the fire-extinguisher to explode under extreme circumstances, placing rescue personnel such as fire-fighters in additional danger. In order to reduce the possibilities of these extreme circumstances causing an explosion, a vessel provided with thicker walls can be used. Such measure however increases the weight of the fire-extinguisher and this reduces its usability; so in practice the risk remains.

In view of the disadvantages mentioned above, it is recommended not to construct said vessels using metal/steel. In this case, a suitable synthetic material is more appropriate. Such vessels are not only lighter than their metal counterparts, but they are also cheaper to fabricate. Furthermore, synthetic containers will melt when exposed to high temperatures and thus reduce the potential risk to rescue personnel.

Methods for creating synthetic vessels using gas and/or leak-tight materials are known. WO 2008/119147 A1, published Oct. 9, 2008 in the name of Delgado Junior, describes pressure vessels for use in fire-extinguishers made from a single-layer composite material. This composite material consists of polyamide, glass fiber and minerals such as calcium, aluminum, . . . in addition to other elements such as UV protective additives. No actual method for manufacturing such vessels is described in this document.

Usually, gas and/or leak-tight pressurized vessels are constructed using multiple layers of material. The inner layer, usually made out of a thermoplastic material serves as a barrier layer, or as an impregnable layer for the gas and/or liquid. Around the inner layer, an additional (outer) layer is thermoset material, the arguments for which are provided below.

A known method consists of using an external mold or mandrel, containing a fitting or neckpiece, and using a technique known as roto-molding to apply a wall of thermoplastic material. After this step, the mandrel is removed and an additional wall, consisting of a thermoset material, is added around the thermoplastic inner wall.

Such a roto-molding technique is described in, for example in the French patent no. 1 520 457, granted Mar. 4 1968. The aforementioned patent describes a method for coating the inside of a vessel using a continuous layer of synthetic material. This inner layer is used to halt corrosion or to strengthen the vessel. Hereto roto-molding is used that can consist of placing the vessel on a device that rotates the vessel on a central axis. The synthetic material can then, for example in the form of a powder, be inserted into the vessel. The rotation of the vessel, combined with a heat source will create a continuous layer on the inside of the vessel.

After the manufacture of this inner layer, an additional or external layer should be added. During this second production step, the thermoplastic (inner)layer will serve as internal mandrel or mold.

The material of the external layer can be added through the use of various methods known per se: for example by winding of filaments or fibers, or by addition of according to size pre-cut materials, by spraying or by any other method. As material, always a thermoset synthetic material is chosen. Once the said material is added according to one of the methods described above, a polymerization takes place.

The addition through the use of a winding technique is one of the possible methods. In such a case, the inner thermoplastic layer should be sufficiently strong to avoid deformation during the winding of the outer fibers. To this end, it usually suffices to keep a minimum thickness, depending on the size of the envisaged vessel. The larger the vessel, the stronger the forces that occur during the winding of the thermoset fibers on the inner layer, and consequently the thicker the inner layer should be.

To avoid deformation of the inner thermoplastic layer during the addition of the thermoset-fibers to form the outer layer, one can also make use of a suitable counter-pressure in the inner layer.

Once the material of the outer layer is added through the use of such fiber-winding technique over the inner layer, the fibers should be attached or connected to one another. This occurs during a consolidation step. So as to avoid deformation of the inner layer (and as a result hereof the entire vessel) during this step, the material of the outer layer should necessarily be a thermoset. When such material is choses, the consolidation can occur through the application of cold polymerization.

Thus, as the inner thermoplastic wall that is formed in a first step should act as mandrel as well during the addition of the second outer wall material, as well as during the subsequent polymerization hereof, the material of this second wall or layer should necessarily be a thermoset material.

Such materials are indeed suitable for cold polymerization. The inner thermoplastic wall will then not deform, nor during the addition of the thermoset material of the second wall, nor during the subsequent polymerization step.

However, a double-layered synthetic material consisting on the one hand of an inner layer consisting of a thermoplastic material, and on the other hand of an outer layer consisting of a thermoset material, exhibits some disadvantages.

A first disadvantage is that a thermoplastic and a thermoset material inherently are incompatible, and thus do not yield one strong rigid structure.

In most cases the two layers remain one near to the other, without strong interaction between both layers.

A second disadvantage is that such materials cannot be recycled, or at least are difficult to recycle, in view of the fact that they consist of inherently incompatible materials.

As a result, there exists a long-felt need for a method for manufacturing multi-layered fluid-tight and/or gastight vessels for the holding of liquids and/or gases, that entirely consist of thermoplastic material.

In practice this was up to now either not possible, or quite complicated.

In a number of cases the material of the outer layer or wall is added through the winding of fibers or filaments that in a subsequent manufacturing step are molten one to another by heat.

This melting action by heat however gives rise during this production step to the fact that the inner thermoplastic layer that serves as a mall, by influence of this heat also weakens and consequently deforms. The so produced vessel then is unsuitable for use, for two reasons. On the one hand, this inner thermoplastic layer, as a result of such weakening and deformation, has lost its barrier-acting properties. As a result hereof, the vessel also has lost its gas and/or liquid impermeable properties, and hence becomes unsuitable for use. On the other hand, the final vessel is deformed, as as a result hereof also becomes unsuitable for use.

In the prior art solutions are provided to this problem, but these solutions are unsatisfactory in practice, in particular in the case of the manufacture of relatively small vessels such as pressure vessels for fire-extinguishers.

One such solution provides in the reinforcement of the inner thermoplastic wall from its inner side by using a soluble, inflatable, plaster or mechanical mold that can be disassembled.

French patent Nr. 2 173 837 discloses on its page 1, line 8-9 the use of inflatable internal mandrels. A synthetic layer can then be added to the surface of such mandrel for the manufacture of a vessel.

U.S. Pat. No. 3,220,910, granted Nov. 30, 1965, describes an example of a plaster internal mall or mandrel that can be used for the above purpose.

In practice this solution in particular in the case of relatively small vessels cannot be used. When such plaster mandrel is mechanically removed, the inner wall in most cases is damaged, as a result whereof the vessel appears to have lost its liquid and/or gas tight property. On top hereof, such a plaster mandrel can only be used once, as a result whereof the manufacturing cost of the so produced vessel becomes too high.

The use of a soluble mandrel also does not constitute a satisfactory solution. Either such method is unsatisfactory because parts of the partly solved mandrel remain in the so produced vessel, either such method appears to be expensive and time-consuming. U.S. Pat. No. 3,508,677 describes an example of such soluble mandrel, in particular reference is made to the FIG. 2 of this patent, wherein such a soluble mandrel is shown.

The method whereby an internal mechanically removable mandrel, e.g. consisting of metal parts, is used, is also a time-consuming and hence expensive technique. The difficulties relating to the use of such removable mandrel result from the fact that such mandrel is present inside the vessel. On top hereof such method can only be used in the case of larger vessels, or at least vessels whereby the size of the neckpiece or the fitting is sufficiently large so that the metal parts present inside the vessel can be removed from the vessel through the opening of such fitting.

U.S. Pat. No. 5,266,137 describes an example of such mechanical internal mandrel, that is kept in its correct position by using inflatable 'balloons'. But even in this case the taking apart and removing through the opening of the fitting of the metal parts is a cumbersome activity. Also this should be performed with the necessary care to avoid damage to the internal thermoplastic wall. Even a small damage could lead in most cases to a situation whereby the finally produced vessel has lost its gas and/or liquid tight properties.

U.S. Pat. No. 4,448,628 describes also the use of such mechanically removable mandrels, and states that these can be used for the manufacture of large hollow vessels. Such vessels can be used for example as storage containers or as vessels for the storage of fuels for space vehicles, but are totally unsuitable for the production of smaller vessels.

The aim of the present invention is to bring about a satisfactorily solution to the abovementioned problems.

SUMMARY OF THE INVENTION

The present inventors surprisingly have found that the abovementioned problems can be solved by using the methods described in the claims as set forth hereinafter.

In practical terms, the method according to the invention for the manufacture of a pressure resistant gas and/or liquid tight vessel comprises in principle the following steps:
- providing a removable external mandrel (11) around a neckpiece (10);
- providing at the inside of such mandrel (11) a thermoplastic material for the manufacture of a thermoplastic internal wall (16);
- removal of the external mandrel (11);
- filling of the thermoplastic internal wall (16) with a cooling liquid (17);
- providing to the external side of the thermoplastic wall additional thermoplastic material (18);
- consolidation of the additionally provided thermoplastic material (18);
- removal of the cooling liquid (17);

According to a preferred embodiment, the thermoplastic internal wall (16) is made by roto-moulding or blow-molding.

The additional thermoplastic material (18) is preferably provided through winding, and preferably consolidated under the influence of heat.

The thermoplastic material preferably comprises polybutene-1 and the additionally provided thermoplastic material comprises fiberglass reinforced polybutene-1.

The cooling liquid can consist of water.

According to a preferred embodiment, the neckpiece (10) of the vessel is made of metal, and provided with an external screw thread. The pressurized vessel can be closed with a stopper (21), provided with an internal screw thread-connection that is operationally connected to the external screw thread of the metal neckpiece of the vessel.

Finally, according to a preferred embodiment, a sealing such as a rubber sealing ring (20), is placed between the stopper and the neckpiece of the vessel.

DESCRIPTION OF THE INVENTION

With the aim to clearly show the features of the invention, some preferable embodiments of the invention are shown hereinafter by way of examples. These illustrate a method for the manufacture of a gas and/or liquid tight vessel according to the invention.

Reference is hereby made to the schematic drawings enclosed herewith. The enclosed drawings and detailed description as set forth hereinafter, refer to general and preferred embodiments of the invention.

Drawings and figures are not drawn to scale. The dimensions and the relative proportions do not necessarily correspond to actual embodiments of the invention. Some parts are on purpose enlarged so as to clarify their function and/or their relative positions and/or for illustrative aim. The main purpose of the figures and the drawings is to describe the principle operation of the invention.

OVERVIEW OF THE ENCLOSED DRAWINGS

Figure 7:
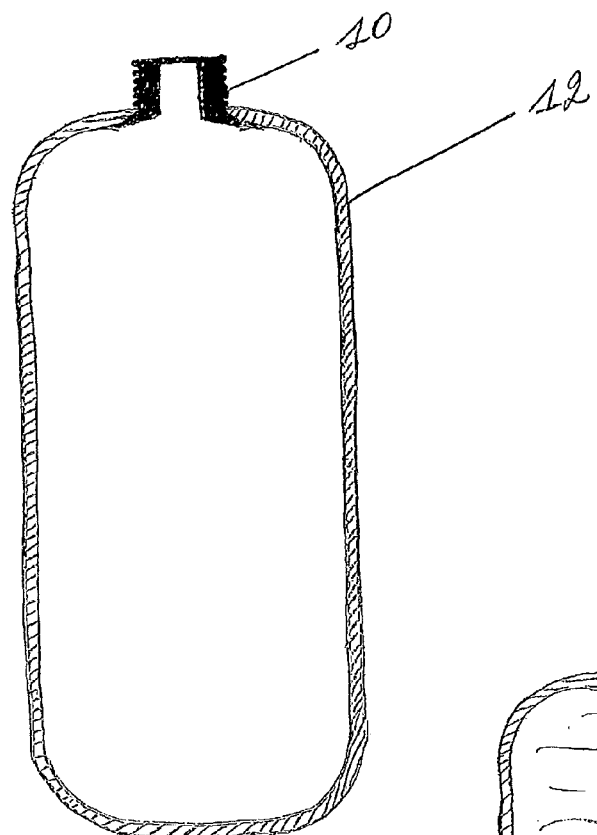

FIG. 7 also shows a drawing of this mandrel and fitting, but in cross-section.

Figure 8:
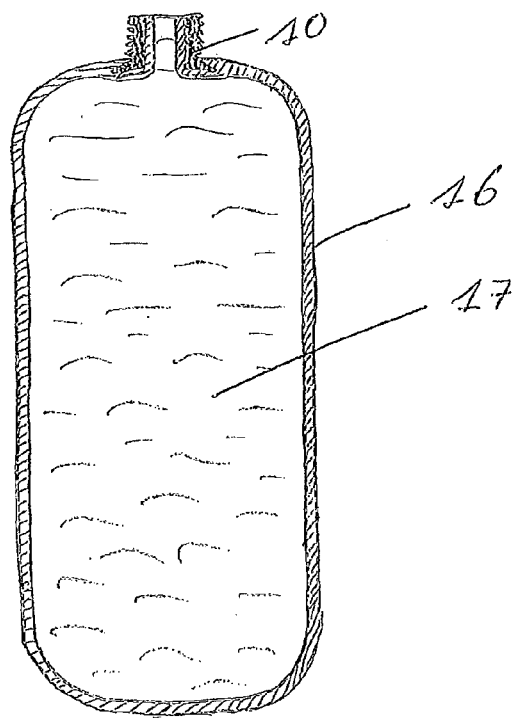

FIG. 8 shows a drawing of the thermoplastic inside wall, filled with the cooling liquid.

Figure 9:
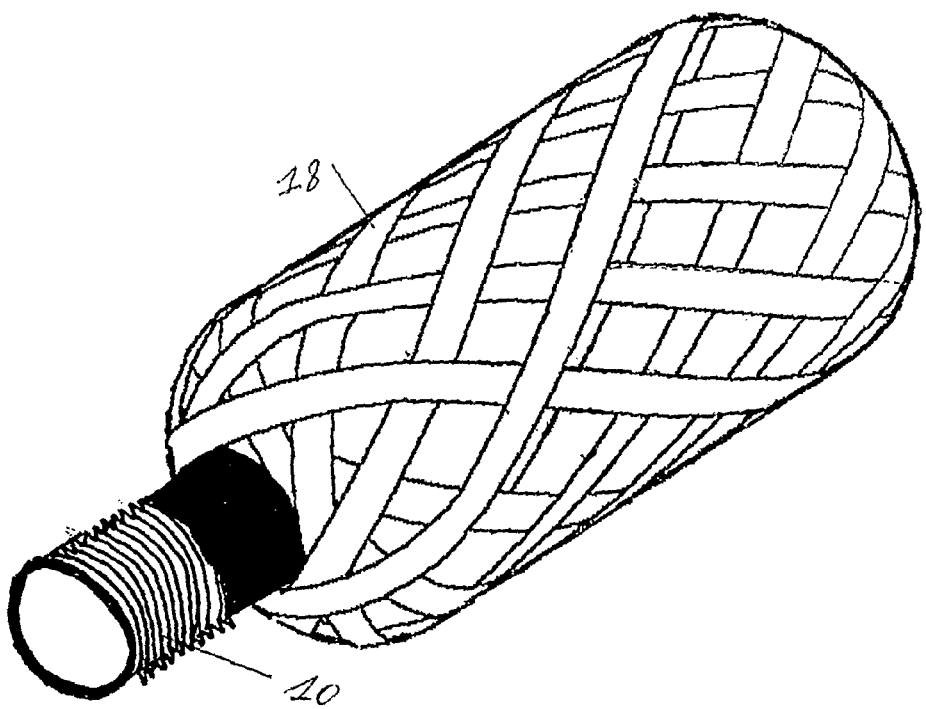

FIG. 9 shows a drawing of the inside wall, whereby part of the additional thermoplastic material is provided through winding.

Figure 10:
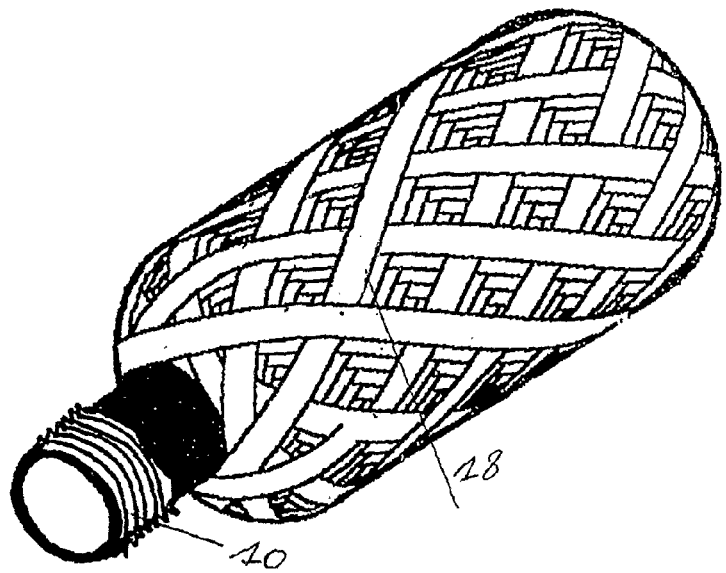

FIG. 10 shows a drawing of the inside wall, once the full additional thermoplastic material has been provided.

Figure 11:
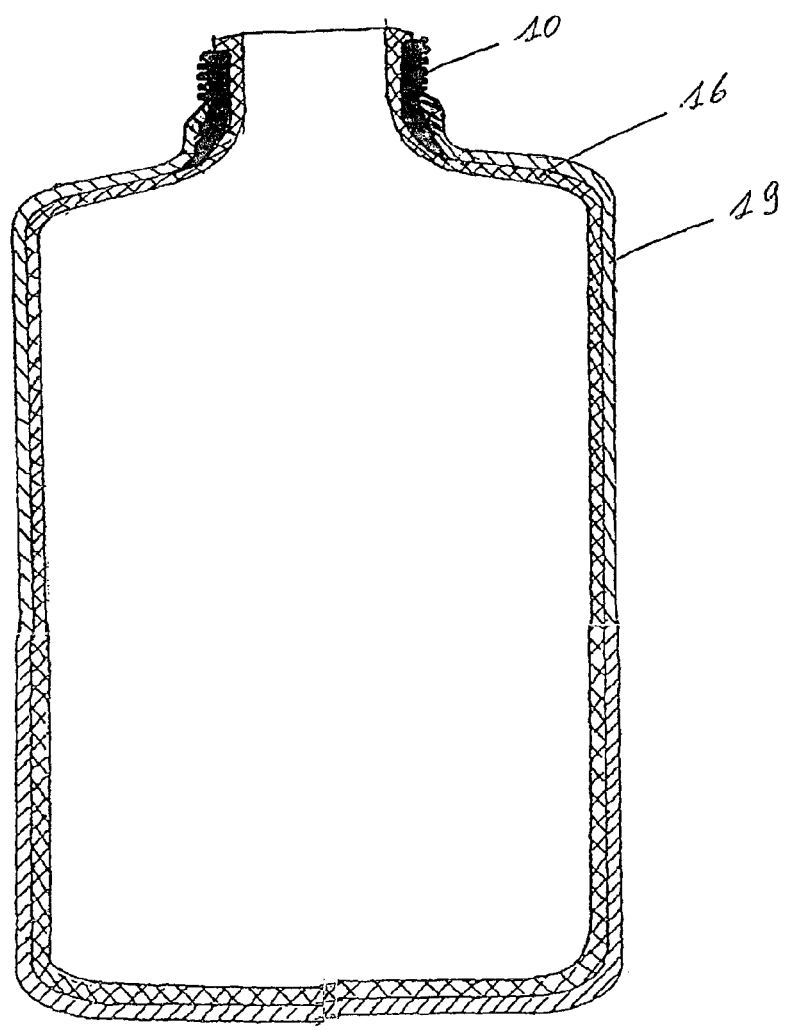

FIG. 11 shows a drawing of the pressurized vessel according to the invention, after consolidation of the additionally provided thermoplastic material.

Figure 12:
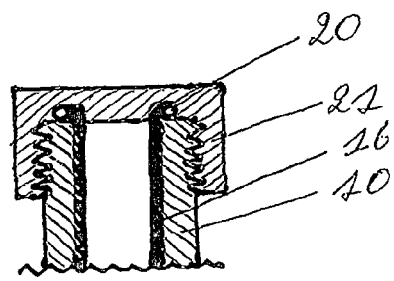

FIG. 12 shows a detail of the pressurized vessel produced according to the method of the invention for use as gas container.

DETAILED DESCRIPTION OF THE INVENTION

As described earlier, the method according to the invention is particularly useful for the manufacture of gas and/or liquid tight containers that should resist a high internal pressure. Such so-called pressurized vessels can be used in for example fire-extinguishers or gas containers. By means of an example, in the description that follows, the vessels produced according to the method according to the invention are described with respect to their application as pressure vessels in fire-extinguishers, but the latter application and description should not be regarded as limited to this specific application. As set forth above, the method according to the invention can also be used for the manufacture of pressurized vessels in other fields of application, such as gas containers.

Figure 1:
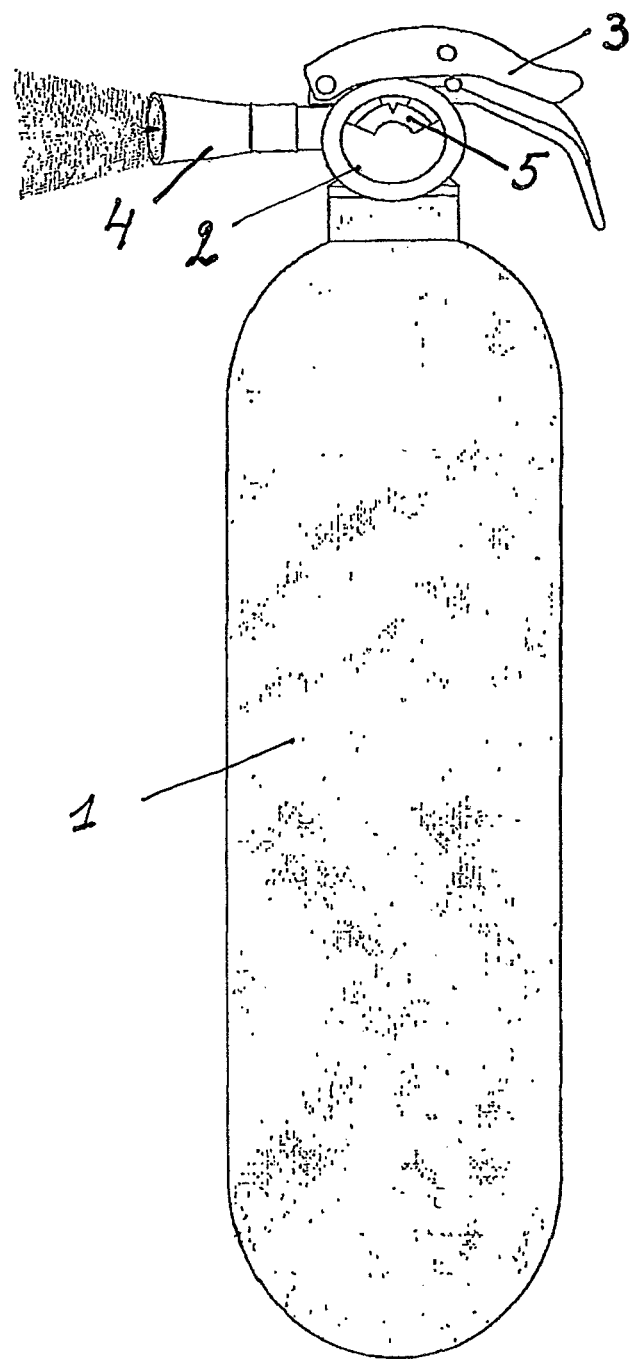
FIG. 1 shows a schematic front view of a fire-extinguisher.

FIGS. 1 to and including 5 show the construction in principle of a typical fire-extinguisher on the basis of a pressurized vessel made out of metal. The pressurized vessel manufactured according to the method of the invention on the basis of thermoplastic materials can be used in such construction as a replacement for the pressurized vessel made out of metal.

A fire extinguisher is an apparatus suitable to extinguish a small fire. It consists of a pressurized vessel, usually in the form of a cylinder, wherein a limited amount of fire-extinguishing material is present under pressure. Also fire-extinguishers exist that contain a pressurized container that should be activated first by means of a red bottom on top of the container. Through an opening the extinguishing material can be put on the fire.

A fire extinguisher roughly consists of a pressurized vessel, an extinguishing compound and a driving gas. When no driving gas would be present in the pressurized vessel, no extinguishing compound would escape from the fire-extinguisher. To this end, some fire-extinguishers have a pressure indicator (manometer) on top of the apparatus. This indicator shows whether the pressure of the driving gas still is sufficient to activate the fire-extinguisher.

As a result fire-extinguishers can be divided into two categories: apparatuses that are permanently under pressure, and apparatuses that are not under permanent pressure (these should be put under pressure by the user for example by means of a activator-bottom).

The extinguishing compound can be in liquid form, but also (e.g. in powder form) in gas form. Fire extinguishing compounds in common use are water, powder (in such case the apparatus is referred to as a powder-extinguisher), foam (in such case the apparatus is referred to as a foam-extinguisher) or carbon dioxide.

George Manby introduced the first portable fire-extinguisher in England in 1813; he invented the principle as applied in the fire-extinguishers as in use in the present days.

The apparatus was made of copper and the container or the pressurized vessel contained liters of a sodium carbonate solution and pressurized air.

FIG. 1 shows a front view of a fire-extinguisher. This apparatus comprises essentially a body 1, in practical terms a pressurized vessel, connected to a mouthpiece embodiment 2. The mouthpiece embodiment comprises a lever 3 for use, and an opening 4. Through the opening the mixture of extinguishing compound, for example an extinguishing solution, and a driving gas are put on the fire.

Figure 2:
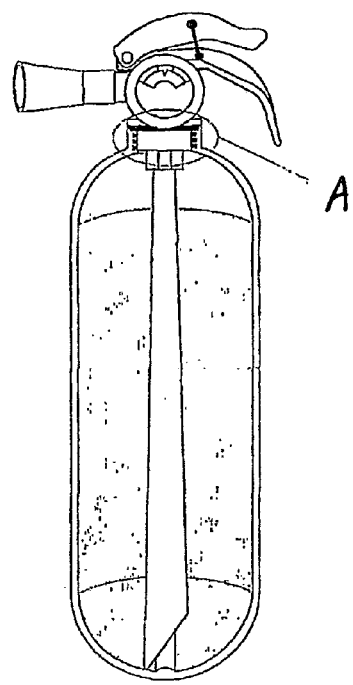
FIG. 2 shows schematically a cross-section of a fire-extinguisher.

The fire-extinguisher also shows a manometer 5, for indicating the remaining pressure in the pressurized vessel. A cut-away view of the fire-extinguisher, is shown in FIG. 2. Letter A refers to the detail of the coupling, shown in FIG. 3.

Figure 3:
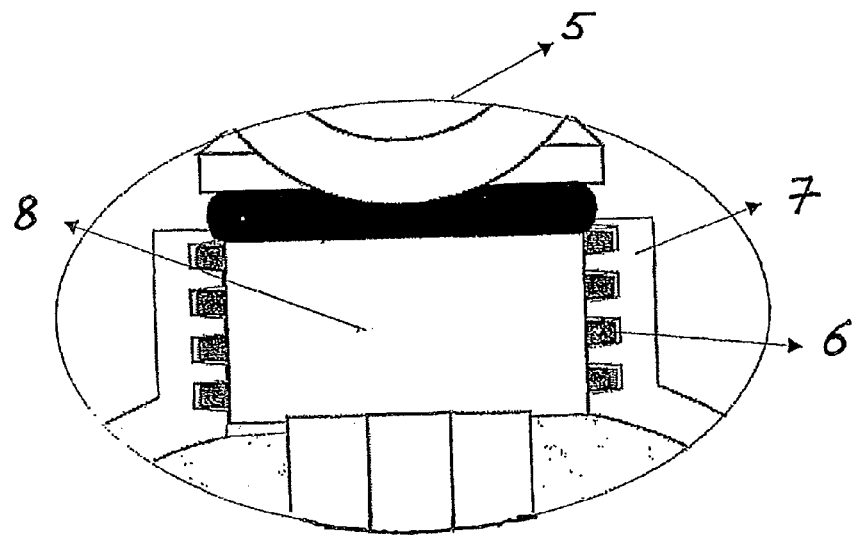
FIG. 3 shows a detail of a coupling between the pressure vessel and the nozzle-piece of a fire-extinguisher.

FIG. 3 shows the coupling of the mouth-piece embodiment 2 of the fire-extinguisher with the pressurized vessel 1, usually in the form of a cylinder. In most cases both these elements are gas-tight connected to each other by means of a screw connection 6. The lower side of the manometer is indicated by number 5. Number 7 indicates the fitting or the neckpiece of the pressurized vessel 1, provided with an internal screw. Number 8 indicates the opening of the neckpiece through which the extinguishing powder and the driving gas are pushed out when the extinguisher is used.

Figure 4:
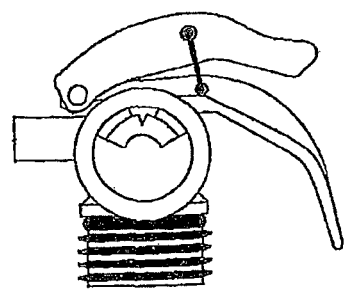
FIG. 4 shows a detail of the nozzle-piece of a fire-extinguisher.

FIG. 4 shows a detail of the mouthpiece embodiment.

Figure 5:
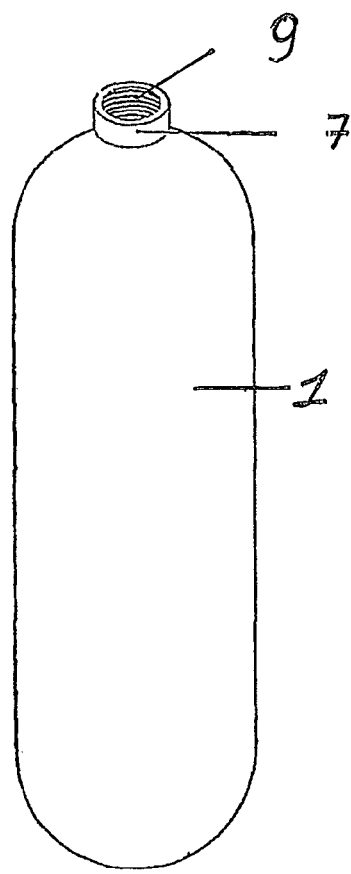
FIG. 5 shows a drawing drawn in perspective of the pressure vessel of a fire extinguisher.

FIG. 5 shows a drawing in perspective of the pressurized vessel 1 of a fire extinguisher, provided with a 'neckpiece' or fitting 7, and an internal screw 9.

As shown on the figures, the pressurized vessel 1 comprises an internal screw thread 9, and the mouthpiece embodiment 2 comprises an external screw thread 6.

In the description that follows, the various steps of the method according to the invention are elucidated by means of the accompanying drawings 6 to and including 11.

Figure 6:
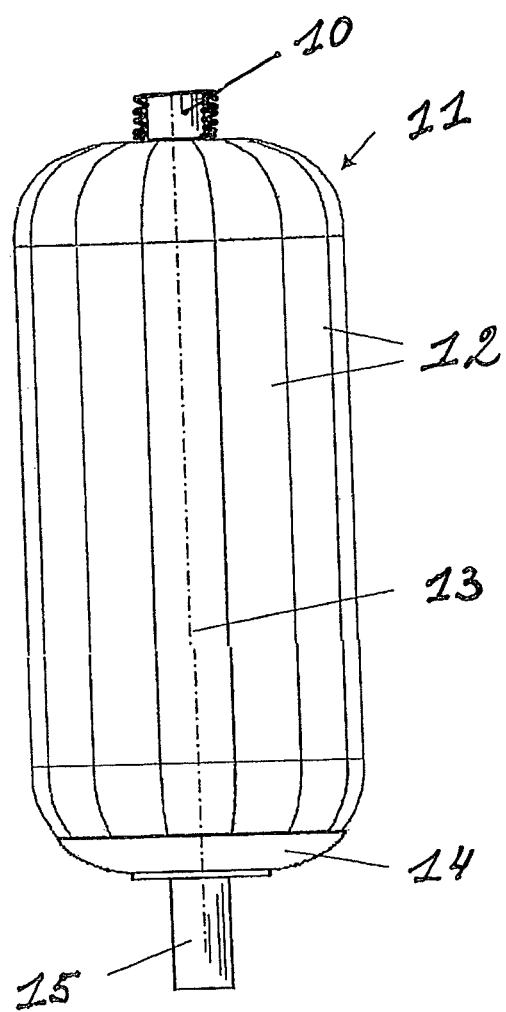
FIG. 6 shows a drawing in front view of a removable external mandrel and a fitting or neckpiece for the manufacture of a thermoplastic inside wall.

FIG. 6 shows in front view a removable external mandrel 11, and a neckpiece or fitting 10. These serve to produce the thermoplastic inner wall.

FIG. 7 shows a cross-sectional view of the external mechanical mandrel 11 with their parts 12 and the fitting 10.

The external mechanical mandrel 11 consists out of a plurality (at least two) of mechanical parts 12, that are kept together by a closing piece 14, or by a ring (not shown), or by a combination of both. The parts are preferably constructed symmetrically around a central axis 13, such that the final container has the form of a cylinder. The whole construction can be mounted on a central axis 15.

The neckpiece or the fitting 10 contains at its upper side an external screw, for the mounting of a mouthpiece embodiment of e.g., a fire extinguisher or the stopper of a gas container. At its lower side it preferably takes the form of a sharp end, so that it can be surrounded by the material of the thermoplastic inner mandrel, and so that it can be irrevocably and in a gas-tight manner connected.

Preferably the parts connect at the lower side of the external screw of the fitting or the neckpiece 10, and leave sufficient room in between the parts and the lower part of the fitting, such that the lower part of the fitting 10 is surrounded by the thermoplastic material of the inner wall 16 as well at the inner—as at the outer side. In this way the fitting 10 is gas and/or liquid tight connected and integrated in the inner thermoplastic wall 16. The constructive parts of the mechanical mandrel can be made out of metal, preferably steel, stainless steel or aluminum.

The thermoplastic wall 16 can be provided at the inner side of the mechanical outside mandrel 11 by means of the roto-molding technique, known per se.

Roto-moulding, or rotational forming, also known under the terms roto-casting (rotational casting) or spin-casting, is a method know for those skilled in the art, for the formation of hollow objects, usually made of a synthetic material.

To this end the mechanical external mandrel or mold 11 is heated and filled with a pre-weighted amount of synthetic material, in particular a thermoplastic material; hereafter it is slowly rotated around one or two axes (that in this case are positioned vertically one to the other). In this manner the weakened or molten synthetic material is divided over the walls of the mandrel. So as to obtain an even thickness of the thermoplastic synthetic material over the entire surface of the mechanical mandrel, the mandrel preferably is moved during the entire duration of the process, as well as during the cooling-off of the thermoplastic synthetic material. The latter is performed to avoid deformation during the cooling-off stage.

An alternative technique to provide the thermoplastic inner wall, is the formation through blowing, the so-called blow-molding technique.

In this technique a pre-form of the thermoplastic inner wall is blown against the inner side of the mechanical mandrel 11. This technique is described for example in patent WO 01/14212, published on Mar. 1, 2001, and cited above.

Once the thermoplastic inner wall is formed according to the method described above, the external mechanical mandrel 11 is demounted and removed, and the inner wall 12 is filled with a cooling, liquid 17. The inner wall 16 filled with the cooling liquid 17 is shown in FIG. 8.

Hereafter, additional thermoplastic material is provided to the external side of the inner wall 16, made according to the steps of the method described above.

In a preferred embodiment of the invention, this material is provided by means of a winding method known per se.

According to this method, the thermoplastic material in the form of filaments, fibers or stripes 18 is in a manner known per se unwounded from a bobbin, and through a winding mechanism provided on the inner wall 16 in subsequent windings 18. The winding operation is continued until the material reaches a sufficient thickness.

The winding mechanism should be chosen such that a more or less uniform thickness is reached over the entire surface of the inner wall 16. FIGS. 9 and 10 illustrate same, as described hereinafter.

So as to obtain a good cohesion of the various strokes of thermoplastic material to each other and to the surface of the inner wall 16, a consolidation takes place. The consolidation of this additionally provided thermoplastic material can be performed either together, or simultaneously with the provision of the additional thermoplastic material, for example through winding. It can also be performed subsequently thereto, or during the winding operation, or thereafter.

In this operation the additionally provided thermoplastic material is uniformly heated above its weakening temperature. On the one hand as a result hereof it sticks to each other and so forms an additional external wall 19. On the other hand it sticks to the external side of the inner wall 16. As a result hereof one rigid uniform structure is created, consisting of the inner wall 16 and the outer wall 19.

The present inventors have found that the presence of the cooling liquid 17 inside the wall 16 has a superbly advantageous and surprising effect in the method according to the invention.

Of the one part this cooling liquid causes the inner part of the inner wall 16 to remain sufficiently cool so that it keeps its rigidity and stiffness so that it can function as internal mandrel or mall, as well during the provision of the additional thermoplastic material of the external wall 19, as during the hot consolidation phase of this material.

Of the other part, the effect of this cooling liquid is limited, such that the outer part of the inner wall 16 during the consolidation phase of the additionally provided thermoplastic material slightly weakens by the heat used in such consolidation operation.

This partly weakening results in the fact that the inner wall 16 together with the consolidated outer wall 19 forms one indivisible and tight structure; this advantageously gives rise to a mechanical strength and a gas and/or liquid tight property of the resulting vessel.

The external part of the inner wall 16 weakens during the consolidation operation; as a result it forms one indivisible part with the additionally provided thermoplastic material. Hereby the resulting pressurized vessel maintains its mechanical strength, and also keeps its gas and/or liquid tightness and its original shape.

Once the steps as described above have been performed, the cooling liquid is removed and the vessel is ready for use.

FIG. 11 shows in cross section the pressurized vessel according to the invention, after consolidation of the additionally provided thermoplastic material. Number 10 indicates as set forth above the fitting or neckpiece, to connect the pressurized vessel for example to a mouthpiece embodiment of a fire extinguisher, as described earlier. Number 16 indicates the thermoplastic inner wall and number 19 indicates the additional thermoplastic outer wall, reinforced with for example glass fibers. The drawing is illustrative in the sense that the division between the material of the inner wall and the external wall 19 in practice is not that sharp as may appear from the drawing. In view of the weakening of the external side of the inner wall 16 during the consolidation stage of the external wall, this inner wall forms one rigid structure with the outer wall 19; as set earlier, this advantageously influences the mechanical strength of the entire pressurized vessel, and its gas and/or liquid impermeable properties.

The vessels made according to the method of the invention are suitable for application in various types of pressurized vessels such as fire extinguishers or gas containers.

In the case of an application as fire extinguisher, the vessel made according to the method of the invention is provided for example with a steel neckpiece or fitting, comprising an internal or external screw thread. Through this screw thread the vessel is operationally gas tight connected to the mouthpiece of the fire extinguisher.

Preferably a metal neckpiece is provided. In this case as well an internal or external screw thread can be used. In case the neckpiece is made of a composite material, it is recommended to provide an internal screw thread, as such internal screw thread generally is more resistant to wear.

In case the vessel made according to the method of the invention is used as gas container, the pressurized vessel should be separated from the outside world by a stopper that is screwed on the neckpiece or the fitting. Also in this application the neckpiece or fitting is provided with a screw that is operationally connected to the screw of the stopper. The gas connection or watertight connection or both between the two are then realized by means of a round closing element, usually made of an elastic material such as rubber. This closing method is used for example for the storage of gases.

The neckpiece can be provided for example with a screw thread, provided at the inner side hereof. This is a so-called internal screw thread. In this case the closing stopper should be provided with an external screw thread.

The other way round is also feasible, the neckpiece then contains a screw thread at the outer side and the stopper contains an internal screw thread.

If the neckpiece is made of a composite material, then generally an internal screw thread is recommended. This is usually more resistant to wear in comparison to an external screw thread.

Whether an internal or external screw thread is chosen, and whether this is made out of metal or a composite material, depends on the specific application one has in mind for the pressurized vessel made according to the invention, for example for use as fire extinguisher or as gas container.

FIG. 12 shows a detail of a pressurized vessel made according to the method of the invention, as part of a gas container. To this end the neckpiece or fitting 10 of the pressurized vessel is closed by means of a stopper or closing ring. Number 21 indicates the closing stopper, make out of metal or for example glass fiber reinforced synthetic material; number 20 indicates the closing or sealing ring, made out for example of synthetic rubber, e.g. neoprene.

As such the vessel according to the invention can be used for the storage of gases, for example as gas container.

As thermoplastic material for the inner wall for use in the present invention, a choice can be made out of for example polyethylene, polypropylene, polybutene, ethylenevinylalcohol, . . . Especially preferred is polybutene-1 (PB-1). Polybutene-1 is a polymer that can be sourced from the company Lyondell Basell, from the Netherlands.

Preferably for the additional thermoplastic material of the outer wall, a choice can be made out of the following materials: continuous high-strength fibers or filaments (pre-) impregnated or co-mingled with a thermoplastic material. The term co-mingled refers to a technique whereby filaments of a thermoplastic material on the one part, and high-strength fiber-filaments of the other part are both unwounded from a bobbin so as to be provided on the inner wall, as produced according to the invention, through winding.

An alternative embodiment comprises a thermoplastic compound pre-impregnated with the fibers or tapes. This may occur during the production of the pre-impregnated fibers or tapes, or shortly before the provision to the inner wall during the production method according to the invention.

Instead of fibers, strokes or stripes or tapes can alternatively be used for the winding operation. As high-strength fibers use can be made for example of glass-fibers, carbon fibers, metal fibers, mineral fibers, wool, cotton, polyester, polypropylene, basalt, Kevlar, aramids, stretched thermoplasts, or a mixture of one or more of the abovementioned or similar fibers.

According to a preferred embodiment, the additional thermoplastic material is provided by means of a winding technique. This is a technique known as such. The advantage to provide the additional thermoplastic material in this way is that the known advantages and machines for this technique can be used. According to this technique the fibers or tapes are provided in a quick and simple manner, without noticeable human intervention, on a standard winding machine automatically on the inner wall.

During this operation, various fibers or tapes are provided one after the other such that they overlap with one another and in this way render the necessary mechanical strength to the vessel according to the invention. FIG. 9 shows the thermoplastic inner wall, whereby part of the additional thermoplastic material is provided through winding;

FIG. 10 shows the thermoplastic inner wall, once the complete additional thermoplastic materials has been provided through the winding operation.

Reference sign 18 indicates the various strokes of material that are provided by means of this winding technique. This may consist, as indicated supra, of strokes, strips or filaments of a glass-reinforced polybutene or polypropylene thermoplastic polymer. These are provided by means of an appropriate winding technique such that subsequent strips overlap each other. As a result of the consolidation of these overlapping strips, a tight and uniform structure will result that comprises the additional outer wall 19, shown in FIG. 11.

For example U.S. Pat. No. 3,367,815 and British patent 1 255 738 also describe this winding technique for providing filaments for the production of gas and/or liquid tight vessels.

As cooling liquid in the method according to the invention, commonly available water can be used. This cooling liquid may be stirred when providing the additional thermoplastic material and the consolidation phase. The advantage hereof is that the temperature in the cooling liquid remains uniform during these steps of the method according to the invention, although this is not strictly necessary. It is also possible to additionally cool the cooling liquid within the thermoplastic inner layer through means of a serpentine in the method according to the invention. This procedure however is rather cumbersome, and it was found not to be necessary to obtain the advantageous effects of the method according to the invention.

The invention claimed is:

1. Method for the manufacture of a pressure resistant gas and/or liquid tight vessel, comprising:
   a) providing a removable external mandrel around a neckpiece;
   b) providing at the inside of such mandrel a thermoplastic material for the manufacture of a thermoplastic internal wall;
   c) removing the external mandrel from said neckpiece and the thermoplastic internal wall;
   d) filling of the thermoplastic internal wall with a cooling liquid;
   e) providing to the external side of the thermoplastic wall additional thermoplastic material;
   f) consolidating the additionally provided thermoplastic material while the cooling liquid remains in contact with the thermoplastic internal wall to sufficiently cool the internal wall to avoid deformation thereof; and
   g) removing the cooling liquid from the thermoplastic internal wall.

2. Method according to claim 1, wherein the thermoplastic internal wall is made by roto-molding or blow-molding.

3. Method according to claim 1, wherein the additionally provided thermoplastic material is consolidated by heat.

4. Method according to claim 1, wherein the additional thermoplastic material is provided through winding.

5. Method according to claim 1, wherein the thermoplastic material is polybutene-1 and the additional thermoplastic material is glass fiber-reinforced polybutene-1.

6. Method according to claim 1, wherein the cooling liquid is water.

7. Method according to claim 1, wherein the neckpiece of the container is made of metal and provided with an external screw thread.

8. Method according to claim 7, wherein the container is sealed by a stopper, provided with an internal screw thread connection that is operatively connected to an external screw thread of the metal neckpiece of the container.

9. Method according to claim 8 wherein a sealing is provided between the stopper and the neckpiece of the container.

10. Method according to claim 8 wherein a sealing ring is provided between the stopper and the neckpiece of the container.

\* \* \* \* \*